United States Patent
Wechlin et al.

(10) Patent No.: US 9,203,258 B2
(45) Date of Patent: Dec. 1, 2015

(54) DEVICE FOR THE INDUCTIVE TRANSFER OF ELECTRICAL ENERGY

(75) Inventors: Mathias Wechlin, Kandern (DE); Andrew Green, Malsburg-Marzell (DE)

(73) Assignee: CONDUCTIX-WAMPFLER GMBH, Weil Am Rhein-Markt (DE)

( * ) Notice: Subject to any disclaimer, the term of this patent is extended or adjusted under 35 U.S.C. 154(b) by 856 days.

(21) Appl. No.: 13/383,912

(22) PCT Filed: Jul. 9, 2010

(86) PCT No.: PCT/EP2010/059873
§ 371 (c)(1),
(2), (4) Date: Mar. 30, 2012

(87) PCT Pub. No.: WO2011/006842
PCT Pub. Date: Jan. 20, 2011

(65) Prior Publication Data
US 2012/0187773 A1    Jul. 26, 2012

(30) Foreign Application Priority Data
Jul. 14, 2009   (DE) .......................... 10 2009 033 239

(51) Int. Cl.
*H01F 27/42* (2006.01)
*H02J 7/02* (2006.01)
*B60L 11/18* (2006.01)

(52) U.S. Cl.
CPC ............... *H02J 7/025* (2013.01); *B60L 11/182* (2013.01); *B60L 11/185* (2013.01);
(Continued)

(58) Field of Classification Search
CPC ............................ B60L 11/1831; H02J 7/025
USPC ....................................................... 307/104
See application file for complete search history.

(56) References Cited

U.S. PATENT DOCUMENTS

| 4,496,896 A | 1/1985 | Melocik et al. |
| 7,880,337 B2 | 2/2011 | Farkas |

(Continued)

FOREIGN PATENT DOCUMENTS

| JP | 2003224937 A | 8/2003 |
| JP | 2005168232 A | 6/2005 |

(Continued)

OTHER PUBLICATIONS

English translation of Japanese Office Action mailed Aug. 12, 2013 for JP2012519986.

(Continued)

*Primary Examiner* — Daniel Cavallari
(74) *Attorney, Agent, or Firm* — Fleit Gibbons Gutman Bongini & Bianco PL; Martin Fleit; Paul D. Bianco

(57) ABSTRACT

The invention relates to a device for the inductive transfer of electric energy from a stationary unit that has at least two similar primary inductances (1-4) to a vehicle (5) standing adjacent to said unit. The primary inductances (1-4) of the stationary unit can be supplied with electrical current independently of one another and the current supply can be individually activated or deactivated by a central control unit (12). Preferably, the device is equipped with a uniform two-dimensional arrangement (26-32, 27A-31A) of a plurality of primary inductances that are similar to one another and are in the form of a rectangular matrix (26-31). Either a dedicated output of a central current supply unit or a dedicated current supply unit (7-10) is assigned to each primary inductance. Preferably, the vehicle has several secondary inductances that are similar to one another, the dimensions and arrangement of said inductances being designed in such a way that several pairs of secondary and primary inductances overlap at any one time in at least one position of the vehicle (5A, 5B, 5C).

20 Claims, 4 Drawing Sheets

Figure 1:
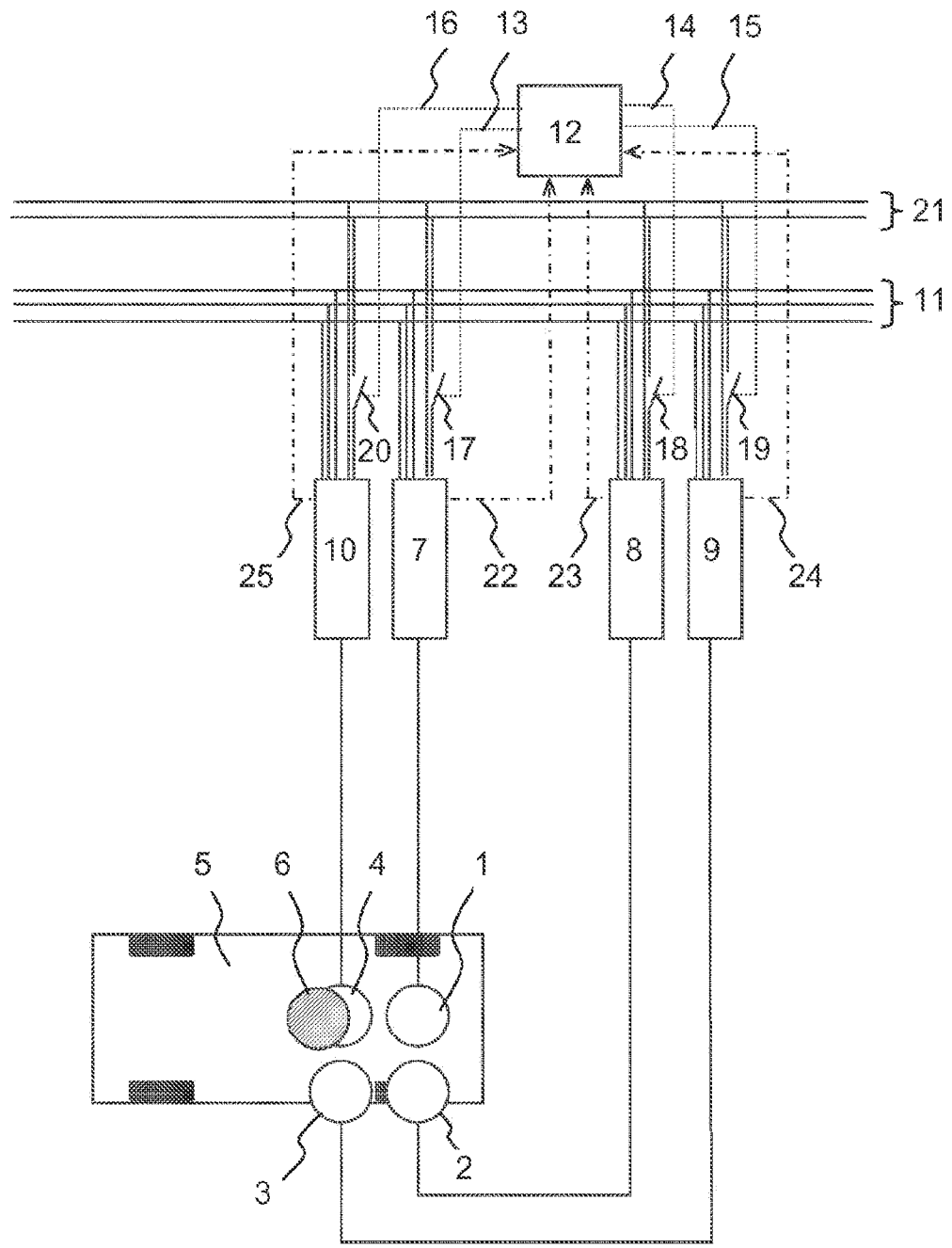

(52) U.S. Cl.
CPC ......... *B60L 11/1831* (2013.01); *Y02T 10/7005* (2013.01); *Y02T 90/121* (2013.01); *Y02T 90/122* (2013.01); *Y02T 90/125* (2013.01); *Y02T 90/128* (2013.01); *Y02T 90/14* (2013.01)

(56) References Cited

U.S. PATENT DOCUMENTS

| | | | |
|---|---|---|---|
| 2008/0265684 | A1 | 10/2008 | Farkas |
| 2009/0045773 | A1* | 2/2009 | Pandya et al. .................. 320/108 |
| 2009/0096413 | A1* | 4/2009 | Partovi et al. .................. 320/108 |
| 2010/0117596 | A1 | 5/2010 | Cook et al. |
| 2010/0231163 | A1* | 9/2010 | Mashinsky .................... 320/108 |
| 2011/0163542 | A1 | 7/2011 | Farkas |
| 2011/0221385 | A1* | 9/2011 | Partovi et al. .................. 320/101 |
| 2011/0285210 | A1* | 11/2011 | Lemmens et al. ............. 307/104 |
| 2011/0291491 | A1 | 12/2011 | Lemmens et al. |
| 2012/0175967 | A1 | 7/2012 | Dibben et al. |

FOREIGN PATENT DOCUMENTS

| | | |
|---|---|---|
| JP | 2006149168 A | 6/2006 |
| WO | 84/04212 A1 | 10/1984 |
| WO | 2008/051611 A2 | 5/2008 |
| WO | 2009/081115 A1 | 7/2009 |
| WO | 2009081126 A1 | 7/2009 |
| WO | WO 2009081126 A1 * | 7/2009 |
| WO | 2010/006078 A1 | 1/2010 |

OTHER PUBLICATIONS

International Preliminary Report published Jan. 17, 2012 for PCT/EP2010/059873 filed Jul. 9, 2010.
English translation of Korean Examination Report issued Jun. 4, 2013 for Korean Application No. 10-2012-7003922.
International Search Report published Mar. 17, 2011 for PCT/EP2010/059873 filed Jul. 9, 2010.
Written Opinion for PCT/EP2010/059873 filed Jul. 9, 2010.

* cited by examiner

DEVICE FOR THE INDUCTIVE TRANSFER OF ELECTRICAL ENERGY

FIELD OF THE INVENTION

The invention relates to a device for inductive transmission of electrical energy. Devices of this kind are used for inductive charging of a rechargeable battery installed in an electric vehicle. Nowadays they are usually constructed with a ratio of 1:1 between the primary side and secondary side. As the two sides are matched to one another accordingly, it is not straight forward to use a completely different design of a secondary side for transmission of energy. At the least, the efficiency is greatly reduced and much higher leakage fields occur when the secondary coil is much smaller than the secondary coil.

BACKGROUND OF THE INVENTION

WO 2008/051611 A2 discloses a system for the inductive transfer of electrical power to a vehicle, wherein the stationary primary side as well as the secondary side on the vehicle each comprise a plurality of coils. The coil arrangements on the primary and secondary side are symmetrical to each other. The common power supply unit of the primary coils can vary the phase differences between the currents fed into the primary coils in order to cause an asymmetrical shape of the magnetic flux lines. Thereby the shape of the flux lines is supposed to be adapted to the position of the secondary coils, i.e. a possible lateral misalignment of the secondary coils relative to the primary coils is supposed to be compensated.

SUMMARY OF THE INVENTION

Therefore, the underlying object of the invention is to create a solution for the inductive charging of vehicles with different charging powers at one and the same charging station which is characterized by a high efficiency and minimal leakage losses.

According to the invention, this object is achieved through a device as disclosed herein. Advantageous variants are also disclosed herein.

For inductive transmission of electrical energy from a stationary unit to a vehicle standing in the vicinity hereof, the invention provides at least two primary inductors which are of the same type and can be supplied with electrical current independently of one another, wherein their supply of current can be activated or deactivated individually by a central control unit.

Thus, a core idea of the invention is modularization of the primary inductor which inevitably means corresponding modularization of the secondary inductor. Preferably, a regular two-dimensional arrangement of a plurality of primary inductors of the same type is provided, which for example can have the form of a rectangular matrix. As an alternative to the classic form of matrix, successive rows can each be offset in relation to one another in their longitudinal direction by half the grid spacing of a row in order to obtain a higher packing density.

In the interests of modular construction of the complete system, each primary inductor can be assigned its own current supply unit, all the current supply units being connected with a common control unit which controls the currents fed from the current supply units into the individual primary inductors individually, in particular by activating or deactivating the individual current supply units. As an alternative to this, a central current supply unit can also be provided having a plurality of outputs to each of which is connected an individual primary inductor. In this case, the individual outputs are controlled individually by the control unit.

The decision as to which primary inductors should be supplied with current can be taken by the control unit on the basis of impedance or voltage measurements at the primary inductors through which the presence of a secondary inductor in the area of each individual primary inductor can be determined For this, the current supply unit is equipped with a corresponding measuring device, and the use of a simple voltage measurement for detecting the position of the secondary inductors requires that they are energized.

The number of secondary inductors on the vehicle side can vary between a single primary inductor and the total number of primary inductors of a charging station according to the charging power requirement of a vehicle, and in the case of a plurality of secondary inductors, these should be arranged so that a simultaneous paired overlap can be created between a plurality of secondary inductors and primary inductors by suitable positioning of the vehicle. This is guaranteed when the arrangement of the secondary inductors at least matches a part portion of the arrangement of the primary inductors.

The invention allows the inductive charging of different sizes of electric vehicles having a different power requirement and a secondary side in each case matched to this power requirement in a charging station designed for the power requirement of a large vehicle without any notable losses in the case of smaller vehicles which do not require the maximum possible charging power. Furthermore, for smaller vehicles the invention provides a plurality of equally optimum charging positions, i.e. creates a certain tolerance for the positioning of smaller vehicles. The invention also makes it possible to charge a plurality of smaller vehicles simultaneously in a charging station in place of a single large vehicle.

Apart from this, the modularisation according to the invention provides for higher unit numbers of smaller primary and secondary inductors, which brings cost advantages with mass production. The same also applies accordingly for the current supply units if these are included in the modularization. Another advantage of the invention is the creation of redundancy. Thus, charging with a reduced charging rate is also still possible when a part of the primary and/or secondary inductors and/or current supply units is faulty in that faulty components are switched off and only the intact components are used.

BREIF DESCRIPTION OF THE DRAWINGS

Figure 2:
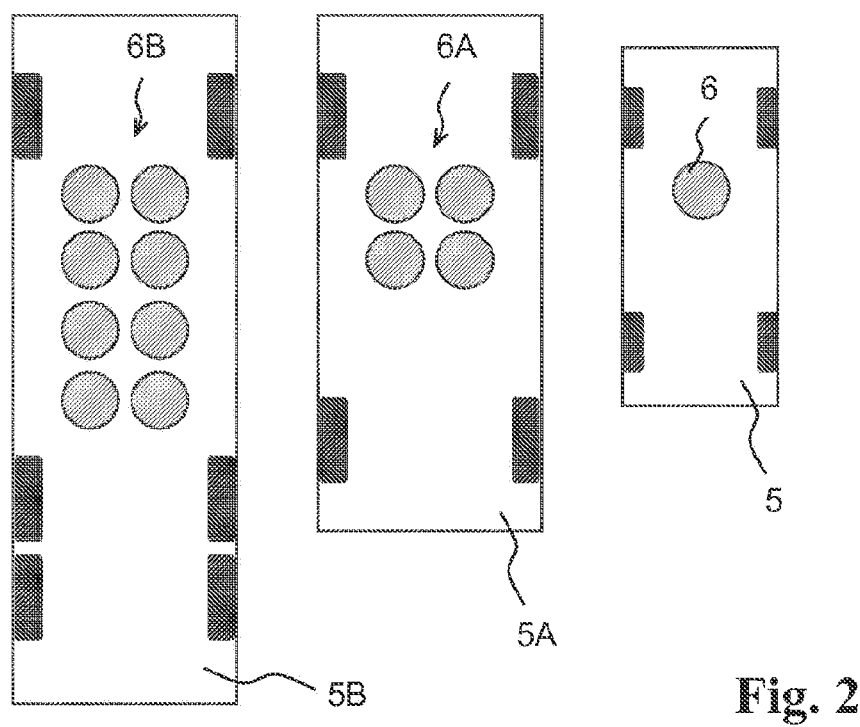
Figure 3:
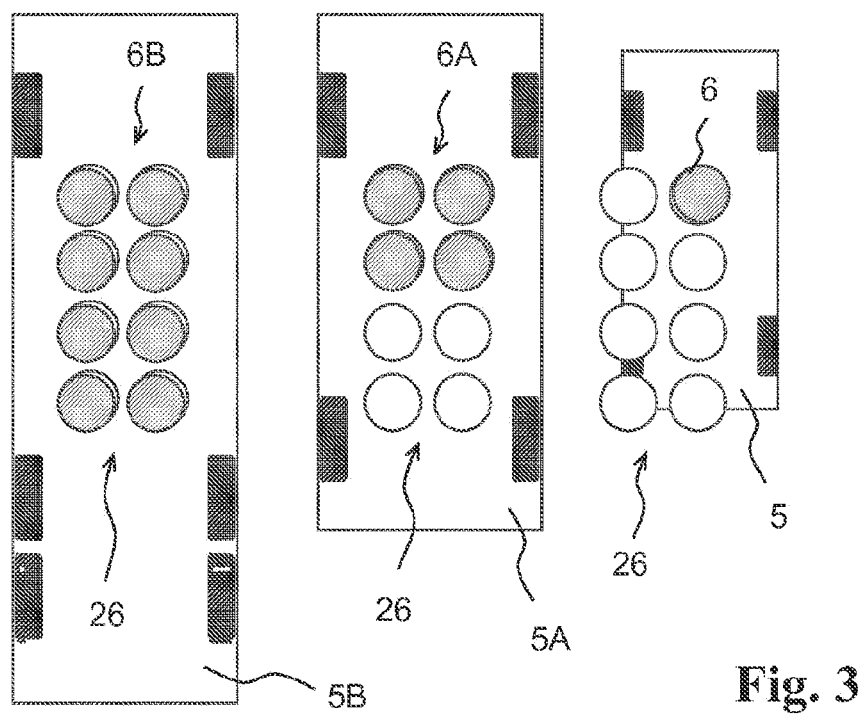
Figure 4:
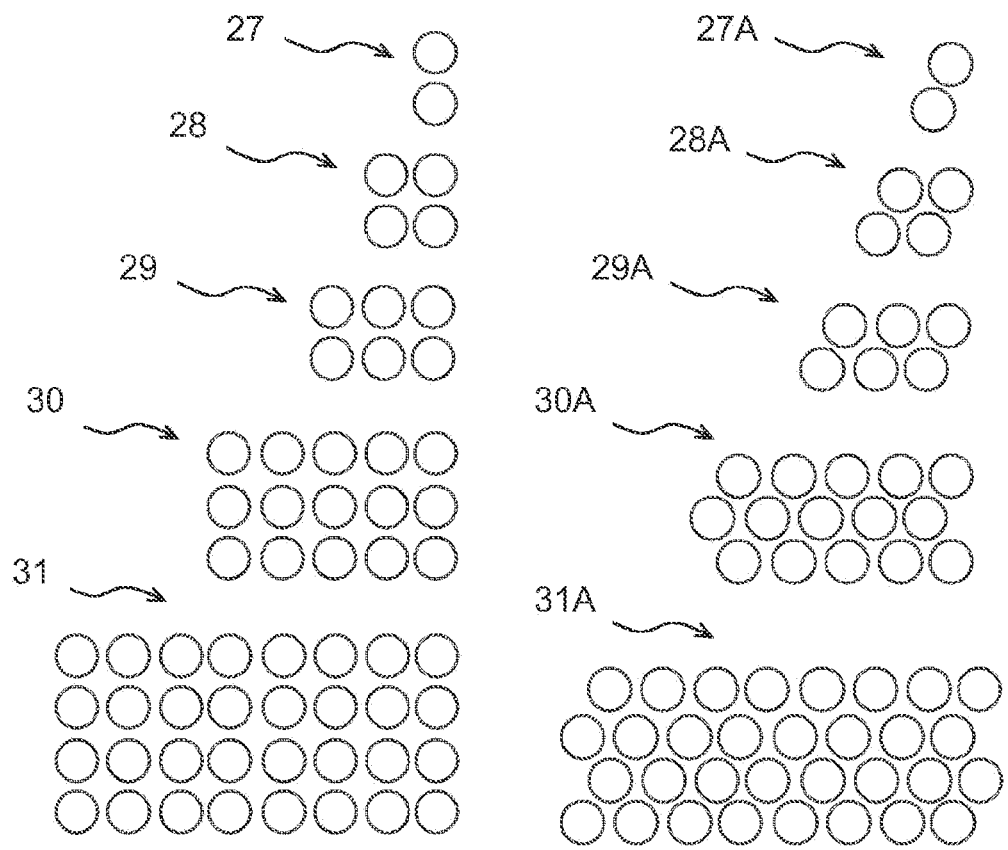
Figure 5:
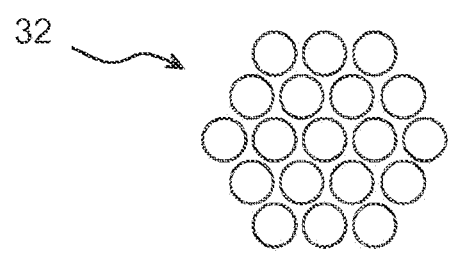
Figure 6:
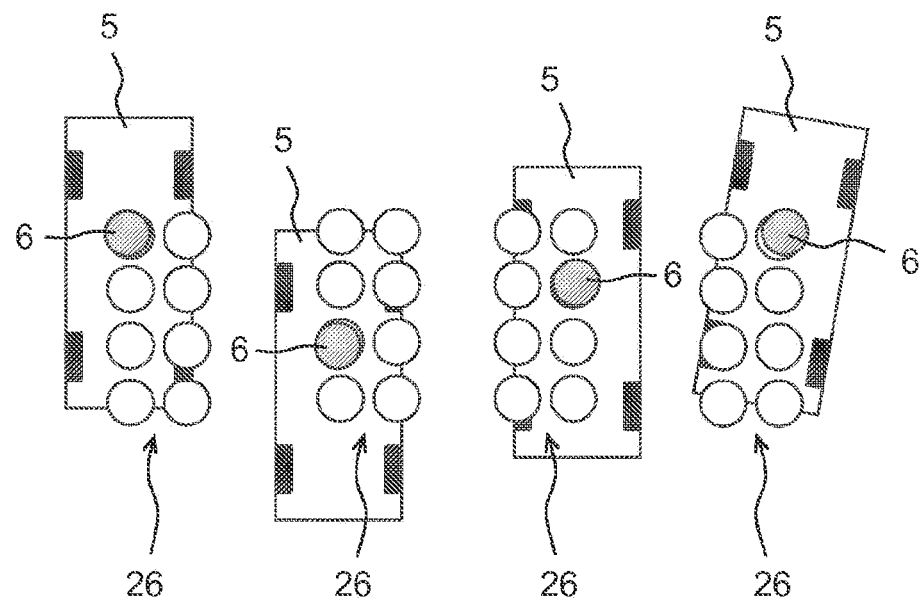
Figure 7:
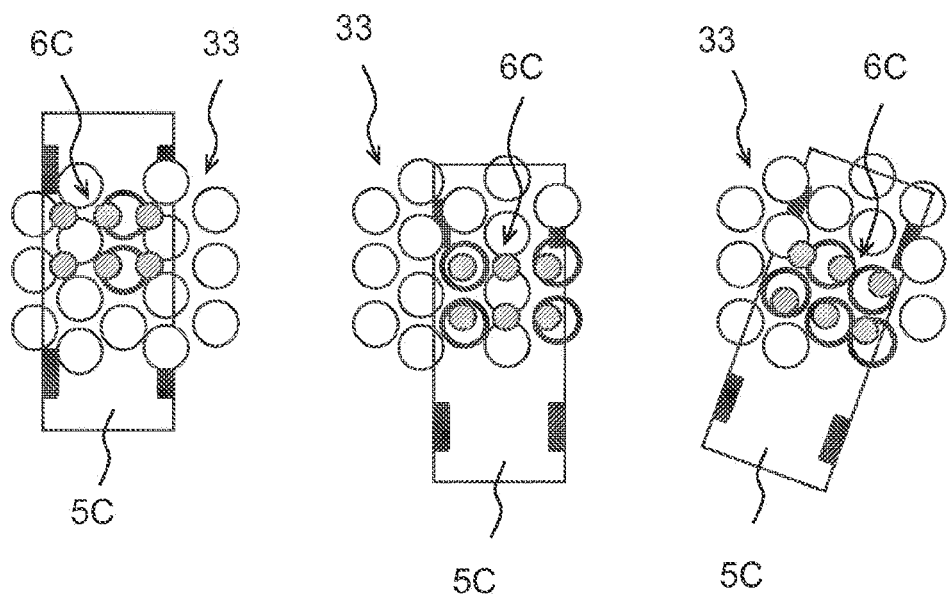

In the following, embodiment examples of the invention are described with reference to the drawings in which:

FIG. 1 shows a diagrammatic illustration of one form of embodiment of a device according to the invention with an electric vehicle roughly in the charging position, FIG. 2 shows diagrammatic illustrations of different sizes of electric vehicle with different secondary coil arrangements, FIG. 3 shows the different sizes of electric vehicles in FIG. 3 in each case in a charging position in a primary coil arrangement according to the invention, FIG. 4 shows a plurality of examples of different primary coil arrangements in matrix form, FIG. 5 shows a primary coil arrangement with rows of coils which are offset and of different lengths, FIG. 6 shows different charging positions of a vehicle with a single secondary coil in a primary coil arrangement according to the invention, and FIG. 7 shows different charging positions of a vehicle with a plurality of secondary coils in a different primary coil arrangement according to the invention.

DETAIL DESCRIPTION OF THE INVENTION

One form of embodiment of a device according to the invention with four primary coils 1 to 4 of the same type in a square arrangement is shown diagrammatically in the plan view in FIG. 1. An electric vehicle 5 which is equipped with only a single secondary coil 6 is just located over the arrangement of the primary coils 1 to 4 for charging. The circular base area of the secondary coil 6 is shown hatched in FIG. 1 to differentiate it from those of the primary coils 1 to 4. This kind of illustration is also used as the basis of all the other figures. The diameter of the secondary coil 6 matches that of the primary coils 1 to 4. As can be seen, the secondary coil 6 covers the primary coil 4 to a large part, but not completely, while it is a distance from the other primary coils 1 to 3. Thus, the position of the vehicle 5 is not ideal for transmission of energy viewed overall, however of all the primary coils 1 to 4 present the primary coil 4 is the only one that is perfectly suitable for this.

The individual primary coils 1 to 4 are in each case connected with their own current supply unit 7 to 10 each of which is connected to a mains lead 11 from which it can draw electrical power in order to pass this to the associated primary coil 1 to 4. The operating parameters (voltage, current, frequency) of the feed into the primary coils 1 to 4 are optimized for inductive transmission to a secondary coil 6 and differ from the operating parameters of the mains lead 11.

The individual current supply units 7 to 10 are connected with a central control unit 12 which has the task of controlling the supply of current to the individual primary coils 1 to 4 by the current supply units 7 to 10 according to need. In the example shown, this means that only the primary coil 4 is to be supplied with current while the other three primary coils 1 to 3 remain inactive. This is carried out by means of control leads 13 to 16 which act on switches 17 to 20 by means of which the current supply units 7 to 10 can be switched individually to a control voltage lead 21. Such a switching operation causes the activation of the respective current supply unit 7 to 10 and as a result the feeding of current into the associated primary coil 1 to 4. In the example shown, the control unit 12 only emits a closing signal for the switch 20 on the control lead 16, through which the current supply unit 10 is activated to supply current to the primary coil 4. No closing signals are emitted on the remaining control leads 13 to 15 so that the switches 17 to 19 remain open and the current supply units 7 to 9 remain inactive.

From the individual current supply units 7 to 10 signal leads 22 to 25 run to the control unit 12. Through these signal leads 22 to 25, impedance measuring devices integrated in the current supply units 7 to 10 each emit measurement signals to the control unit 12 which indicate the impedance values of the primary coils 1 to 4 assigned to each. These impedance values are influenced by the presence of a secondary coil 6 in the area of a primary coil 1 to 4, in particular when this is short circuited, which is perfectly possible in the arrival phase of the vehicle in the primary coil arrangement since no transmission of energy is taking placing yet in this phase. In the situation shown in FIG. 1 only the impedance value of the primary coil 4 is changed by the presence of the secondary coil 6. The impedance values of the remaining primary coils 1 to 3 can be influenced by the bodywork of the vehicle 5. If the system is designed appropriately, the change in impedance caused by this is much smaller than the change in impedance of the primary coil 4 caused by the secondary coil 6.

The control unit 12 comprises an evaluation unit which observes the distribution of the impedance values of the individual primary coils 1 to 4 on the basis of the measurement signals received through the signal leads 22 to 25 and, following comparison with a threshold value, determines over which of the primary coils 1 to 4 a secondary coil 6 is located. In the situation shown in FIG. 1 this is only the primary coil 4 which consequently is selected as the only one to receive current. If the electric vehicle 5 were to move further to the right and its secondary coil 6 were to mainly cover the primary coil 1, this would be selected and the assigned current supply unit 7 would be activated by closing the switch 17 by means of a signal on the control lead 13.

As an alternative to the embodiment example with a plurality of decentral current supply units 7 to 10 presented previously, the invention could also be produced with the aid of a single central current supply unit which exhibits a plurality of separately activateable outputs (zone controller concept or transformer).

Previously, an electric vehicle 5 with only a single secondary coil 6 was assumed. However, the object of the invention is to be able to charge different sizes of vehicles with different power requirements in one charging station. For this, the different sizes of vehicles, as illustrated in FIG. 2, have to be equipped with a different number of secondary coils. Next to a small vehicle 5 with a single secondary coil 6 on the right, in the middle the figure shows a medium sized vehicle 5A with four secondary coils in a square arrangement 6A and on the left a large vehicle 5B with eight secondary coils in a rectangular arrangement 6B. The small vehicle 5 can be a passenger car for example, the medium sized vehicle 5A can be a van or mini bus, and the large vehicle 5B can be a truck or omnibus. The direction of travel of the vehicles 5, 5A and 5B is the upward direction in FIG. 2 and in FIG. 3.

FIG. 3 shows the different sizes of vehicles 5, 5A and 5B from FIG. 2 over a rectangular arrangement 26 of eight primary coils. Like the embodiment example shown in FIG. 1, each individual primary coil of the arrangement 26 is assigned its own current supply unit which is no longer shown in FIG. 3 and all the following figures, and a central control unit is provided which is also not shown any more. The geometry of the primary coil arrangement 26 is exactly the same as the geometry of the secondary coil arrangement 6B of the large vehicle 5B, both as regards the size of the individual coils and as regards their number and their arrangement in relation to one another.

The large vehicle 5B in FIG. 3 on the left is located in an almost optimum charging position in that the secondary coil arrangement 6B almost exactly covers the primary coil arrangement 26, i.e. every individual secondary coil lies exactly over a primary coil. In this case, all the primary coils of the arrangement 6B are activated and used to charge the battery of the vehicle 5B. The primary coil arrangement 26 and the secondary coil arrangement 6B are designed so that an adequately large amount of power can be transmitted to charge the battery of the large vehicle 5B at an appropriate rate. For the large vehicle 5B there is only one optimum charging position in the illustrated direction of travel as the complete covering of the secondary coil arrangement 6B with the primary coil arrangement 26 is only possible in one position. In the reverse direction of travel there would also be only one optimum charging position. This is not a problem as large vehicles such as omnibuses or trucks are driven by specially trained drivers with appropriate driving expertise who can be trusted to position their vehicle with sufficient precision when parking in a charging station.

In the middle of FIG. 3 the medium sized vehicle 5A is also located in an almost optimum charging position in that the secondary coil arrangement 6B comprising four secondary coils in this case almost exactly covers half of the primary coil arrangement 26, i.e. every single secondary coil lies exactly over a primary coil of said half In this case, four of the eight primary coils of the arrangement 26, namely the front four in the driving direction in FIG. 3, are activated and used to charge the battery of the vehicle 5B. The primary coil arrangement 26 and the secondary coil arrangement 6A are designed so that in that case as well a sufficiently large amount of power can be transmitted in order to charge the battery of the medium sized vehicle 5A at an appropriate rate.

As can be seen from FIG. 3, the secondary coil arrangement 6A of the medium sized vehicle 5A exactly corresponds to a half of the secondary coil arrangement 6B of the large vehicle 5B. Therefore, there are several optimum charging positions for the medium sized vehicle 5A. For example, the medium sized vehicle could also be positioned so that its secondary coil arrangement 6B exactly covers the middle four or the rear four primary coils of the primary coil arrangement 26 in the direction of travel. The same applies to the exact opposite direction of travel. The medium sized vehicle 5A could even stand in a direction of travel rotated through ±90° in relation to that shown. And then there would be in each case three different optimum charging positions in each case exactly covering four primary coils of the primary coil arrangement 26 with the secondary coil arrangement 6B. On the basis of the impedance measurement mentioned previously, in every case it is possible to establish which primary coils of the primary coil arrangement 26 are covered by secondary coils of the secondary coil arrangement 6B in a suitable manner for transmission of energy, and the covered primary coils specifically can be supplied with current and those not covered can be left inactive.

In FIG. 3 on the right the small vehicle 5 is also in an almost optimum charging position in that the single secondary coil 6 in this case almost exactly covers a primary coil of the primary coil arrangement 26. In this case, only one of the eight primary coils of the arrangement 26 is activated, namely the coil located in the front right corner of the arrangement 26 in the direction of travel, and used to charge the battery of the vehicle 5. The primary coil arrangement 26 and the secondary coil 6 are designed so that in this case as well a sufficiently large amount of power can be transmitted to charge the battery of the small vehicle at an appropriate rate.

As can be seen immediately, there are a large number of optimum charging positions for the small vehicle, eight alone in the direction of travel shown in FIG. 3 as the secondary coil 6 can optionally be lined up with every single primary coil of the primary coil arrangement 26. The same applies to the exact reverse direction of travel and for a direction of travel turned through ±90°.

Obviously, the primary coil arrangements shown in [FIGS.] 1 to 3 can be varied within wide limits while maintaining the effect attainable through the invention. Some examples of such variations can be seen in FIGS. 4 and 5. The primary coil arrangements 27 to 31 shown in FIG. 4 on the left-hand side are strictly rectangular, whereas the primary coil arrangements 27A to 31A shown on the right-hand side are parallelogram-shaped or approximately rectangular.

The simplest conceivable arrangement 27 consists of just two primary coils and allows only very coarse grading of the transmission power according to the size of vehicle in two stages. The square arrangement 28 with four coils has already been explained in connection with FIG. 1. The arrangements 29 to 31 are extensions which are based on the form of a matrix consisting of rows and columns with the same spacing between the individual rows and between the individual columns.

Due to the usually rectangular base area of a vehicle body, it appears expedient to align an at least roughly rectangular coil arrangement with the longer side in the proposed direction of travel of the vehicle to be charged. In the boundary case, just a single row of coils arranged one behind another in the proposed direction of travel of a vehicle to be charged could also be provided. As a rule, the arrangement of primary coils in rows with the transmission power levels attainable nowadays is limited by the existing lengths of vehicle or useable space for the secondary coils.

The corresponding arrangements 27A to 31A on the right-hand side of FIG. 4 differ from those on the left-hand side in each case in that successive rows are offset in relation to one another in the longitudinal direction of the rows by half the grid spacing of a row. As can be seen in particular from a comparison of the arrangements 30 and 30A and 31 and 31A this offset allows a higher packing density of primary coils, i.e. a given number of primary coils of a given diameter can be accommodated in a smaller area.

The primary coil arrangement 32 according to FIG. 5 corresponds to the arrangements 27A to 31A as regards the offset of successive rows, but overall has no roughly rectangular or parallelogram-like form, but a hexagonal form with a total of six axes of symmetry.

The positional tolerance of the primary coil arrangement according to the invention in relation to vehicles with fewer secondary coils mentioned previously already in connection with FIG. 3 is made clear by the examples shown in FIGS. 6 and 7. Here, FIG. 6 starts with the situation underlying FIG. 3 on the right in which an electric vehicle 5 with only a single secondary coil 6 is to be charged in a charging station with a rectangular arrangement 26 of eight primary coils, with the proposed direction of travel of the vehicle 5 the upward direction.

In the vehicle position shown on the far left, the secondary coil 6 lies over the foremost primary coil in the left-hand column in the direction of travel. In the vehicle position shown next beside it on the right the secondary coil 6 lies over the secondary primary coil from the rear in the left-hand column. In the vehicle position shown next on the right beside it the secondary coil 6 lies over the second primary coil from the front in the right-hand column. In the vehicle position shown on the far right the secondary coil 6 finally lies over the foremost primary coil in the right-hand column in the direction of travel, with the vehicle 5 standing not exactly in the proposed direction of travel but at a slight oblique angle thereto. Thus, in the situation underlying FIG. 6 there is a positional tolerance both in the direction of travel and transversely to the direction of travel, and also with regard to an oblique position of the vehicle in relation to the proposed direction of travel.

For the invention to work, it is not necessary for the base areas of the primary coils and the secondary coils to line up as in FIGS. 1 to 6. FIG. 7 shows an example for the situation in which a vehicle with secondary coils with a smaller base area is to be charged in a charging station with primary coils with a larger base area. The vehicle 5C shown there exhibits a secondary coil arrangement 6C which is marked by hatching and consists of two rows each of three secondary coils lying one behind the other in the direction of travel (at the top in FIG. 7). The primary coil arrangement 33 consists of a total of 17 primary coils which lie one behind the other in seven rows in the direction of travel, the rows in each case being alternately offset laterally by half a row grid spacing and of different length.

On the left-hand side of FIG. 7 the vehicle 5C stands in the proposed direction of travel, but the secondary coils of the secondary coil arrangement 6C lie only partly over primary coils, partly exactly over spaces between different primary coils. In this case, current is only supplied to those primary coils over which secondary coils are located at least roughly. These are here only the two front primary coils of the middle row of the primary coil arrangement 33 over which the two middle secondary coils are located predominantly and the two right-hand secondary coils each roughly up to half The energized primary coils are marked in FIG. 7 by a larger thickness of line. The two left-hand secondary coils are located roughly in the middle over spaces between primary coils. With inphase feeding of the surrounding primary coils, the fields thereof would certainly overlap in the area of the secondary coils lying between them, but the leakage losses would be high, so energizing these primary coils would not appear to be expedient.

In the middle of FIG. 7 the vehicle 5C is also standing in the proposed direction of travel, but in this case the four outer secondary coils of the secondary coil arrangement 6C on the left-hand and right-hand longitudinal sides of the vehicle 5C each lie over primary coils of the primary coil arrangement 33, whereas the two middle secondary coils each lie exactly between two primary coils. Thus, in this case, current has to be supplied to four primary coils covered by secondary coils which are also marked by the thickness of the lines.

On the right-hand side of FIG. 7 the vehicle 5C is standing clearly at an oblique angle to the proposed direction of travel. Even so, in this case five of the six secondary coils each lie over a primary coil so that five primary coils can be energized and the battery of the vehicle 5C can be charged at a relatively high rate. Only the secondary coil in the front left-hand corner of the secondary coil arrangement 6C lies exactly between two primary coils and can therefore not be exposed to a strong alternating magnetic field by the primary coil arrangement 33.

When a vehicle for charging is driven over the primary coil arrangement of a charging station according to the invention, the positioning of the vehicle for the charging operation can be supported by further sensors, e.g. based on radar, ultrasound, infrared light, photoelectric cells, and by wireless communication between the approaching vehicle and the control unit of the charging station, in addition to the impedance measurement already mentioned previously. In particular, here the kind of vehicle can be identified as regards the number and arrangement of the secondary inductors, giving one or more optimum positions for the charging operation into which the vehicle should be manoeuvred with the aid of the impedance measurement and possibly additional sensors.

Here it is also conceivable to energize the secondary coils in the arrival phase of the vehicle to produce its own magnetic field from the vehicle battery in order to make it easier for the charging station to detect their positions. However, the details of the manoeuvring of the vehicle are not the object of the present invention.

It is understood that the charging of the battery of a large vehicle with a high charging rate requires the provision of a relatively high total power. With smaller vehicles this high power allows comparatively rapid charging of the battery. In this way a short standing time of the vehicle in a charging station according to the invention can be offset by a higher charging power.

In residential areas for example most garages for passenger cars only have a single phase mains connection (230V/10A) with which a charging power of approx. 2 kW can be obtained. Therefore, such a garage can be fitted with a single primary coil which is fed by a current supply unit designed for this power. Overnight, a vehicle is charged over a longer period of time with this power. During the day it is possible to charge the same vehicle for example in a company parking bay where a three-phase connection (400V/16A) with a transmission power of approx. 6 kW can be provided easily for a charging station. In this case it is advantageous if the vehicle is equipped with two or more secondary coils, only one of which is used when charging in the garage at home, whereas two or more secondary coils are used when charging for a shorter time in the company parking bay.

Quick-charging electric "filling stations" can also be operated on the basis of this concept. When vehicles are equipped with a plurality of secondary coils, usually only a single secondary coil is used at home and during daily operation. However, when a large quantity of energy has to be transmitted as rapidly as possible, a plurality of secondary coils are used.

When talking here about primary and secondary coils, generally coupled inductors are meant which need not necessarily be coils of conventional type. For example, their base area can be other than the circular shape used as the basis in the embodiment examples and the windings need not be helical but can also be planar. The precise design of the form of the inductors is at the discretion of the specialist in the art.

The invention claimed is:

1. A device for inductive transmission of electrical energy from a charging station to a vehicle, the device comprising:
   at least two primary inductors of a same type, each of the primary inductors electrically connected to a current supply unit such that each primary inductor has its own power supply for producing an electrical output;
   voltage-measuring devices, each current supply unit having a voltage-measuring device integrated therein;
   a controller in electrical communication with the current supply units; and
   signal leads, each current supply unit having a signal lead running to the controller;
   wherein the voltage-measuring devices measure voltage induced by presence of a secondary inductor producing a magnetic field at each primary inductor and emit measurement signals through the signal leads to the controller, each of the measurement signals indicating an induced voltage measured at each primary inductor; and
   wherein electrical current is supplied to each primary inductor individually through a switch activated or deactivated by the controller to control the electrical current supplied to each primary inductor based upon distribution of induced voltages measured at each of the primary inductors.

2. The device according to claim 1, wherein the charging station comprises a two-dimensional arrangement of a plurality of the primary inductors.

3. The device according to claim 2, wherein the plurality of primary inductors is arranged in a form of a rectangular matrix.

4. The device according to claim 2, wherein the plurality of primary inductors is arranged in successive rows having the same row spacing and the same grid spacing within the rows, the successive rows offset in a longitudinal direction by half the grid spacing of a row.

5. The device according to claim 1, further comprising at least one secondary inductor, wherein, when a vehicle is in a charging position, the at least one secondary inductor has a geometry such that it lies over and covers at least one primary inductor.

6. The device according to claim 5, wherein the at least one secondary inductor has a same base area as the base area of the primary inductors.

7. The device according to claim 5, wherein the at least one secondary inductor has a smaller base area than the base area of the primary inductors.

8. The device according to claim 1, further comprising a plurality of secondary inductors, wherein, when a vehicle is in a charging position, the plurality of secondary inductors have an arrangement and a geometry such that they lie over and cover the primary inductors.

9. The device according to claim 8, wherein each of the plurality of secondary inductors has a same base area as the base area of the primary inductors.

10. The device according to claim 8, wherein each of the plurality of secondary inductors has a smaller base area than the base area of the primary inductors.

11. The device according to claim 8, wherein the arrangement of the plurality of the secondary inductors is identical to at least part of an arrangement of the primary inductors.

12. A device for inductive transmission of electrical energy from a charging station to a vehicle, the device comprising:
at least two primary inductors of a same type;
a controller in electrical communication with the at least two primary inductors;
a current supply unit in electrical communication with the controller, the current supply unit having a plurality of separately-activateable outputs;
a voltage-measuring device integrated with the current supply unit; and
a signal lead running from the current supply unit to the controller;
wherein the voltage-measuring device measures voltage induced by presence of a secondary inductor producing a magnetic field at each primary inductor and emits measurement signals through the signal lead to the controller, each of the measurement signals indicating an induced voltage measured at each primary inductor; and
wherein electrical current is supplied to each primary inductor individually from the separately-activateable outputs through a switch activated or deactivated by the controller to control the electrical current supplied to each primary inductor based upon distribution of induced voltages measured at each of the primary inductors.

13. The device according to claim 12, wherein the charging station comprises a two-dimensional arrangement of a plurality of the primary inductors.

14. The device according to claim 13, wherein the plurality of primary inductors is arranged in a form of a rectangular matrix.

15. The device according to claim 13, wherein the plurality of primary inductors is arranged in successive rows having the same row spacing and the same grid spacing within the rows, the successive rows offset in a longitudinal direction by half the grid spacing of a row.

16. The device according to claim 12, further comprising at least one secondary inductor, wherein, when a vehicle is in a charging position, the at least one secondary inductor has a geometry such that it lies over and covers at least one primary inductor.

17. The device according to claim 16, wherein the at least one secondary inductor has a same base area as the base area of the primary inductors or the at least one secondary inductor has a smaller base area than the base area of the primary inductors.

18. The device according to claim 12, further comprising a plurality of secondary inductors, wherein, when a vehicle is in a charging position, the plurality of secondary inductors has an arrangement and a geometry such that they lie over and cover the primary inductors.

19. The device according to claim 18, wherein each of the plurality of secondary inductors has a same base area of the primary inductors or each of the plurality of secondary inductors has a smaller base area than the base area of the primary inductors.

20. A method for charging a battery of an electric vehicle using a device for inductive transmission of electrical energy from a charging station to the electric vehicle, the method comprising the steps of:
positioning the electric vehicle in a charging position at the charging station;
inducing a voltage at at least one of at least two of primary inductors of the device using a magnetic field produced by a secondary inductor of the electric vehicle;
measuring the induced voltage at each primary inductor using a voltage-measuring device of the device;
emitting signals through signal leads of the device to a controller of the device to indicate induced voltage at each of the primary inductors;
comparing the induced voltages to a predetermined threshold;
identifying primary inductors in which the induced voltage exceeds the predetermined threshold and identifying primary inductors in which the induced voltage does not exceed the predetermined threshold; and
supplying electrical current individually to each primary inductor in which the induced voltage exceeds the predetermined threshold through a switch activated by the controller and cutting off electrical current individually to each primary inductor in which the induced voltage does not exceed the predetermined threshold through a switch deactivated by the controller, whereby the battery of the electric vehicle is charged.

* * * * *